(12) United States Patent
Dakshinamoorthy et al.

(10) Patent No.: US 12,192,822 B2
(45) Date of Patent: Jan. 7, 2025

(54) METHOD AND ELECTRONIC APPARATUS FOR OPTIMIZING BANDWIDTH UTILIZATION GTP-U DATA PACKET TRANSMISSION

(71) Applicant: Samsung Electronics Co., Ltd., Suwon-si (KR)

(72) Inventors: Mohgan Perundurai Dakshinamoorthy, Bangalore (IN); Ajith Kumar Kuppan, Bangalore (IN); Sahil Rayu, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 273 days.

(21) Appl. No.: 17/720,881

(22) Filed: Apr. 14, 2022

(65) Prior Publication Data
US 2022/0338053 A1 Oct. 20, 2022

Related U.S. Application Data

(63) Continuation of application No. PCT/KR2022/005407, filed on Apr. 14, 2022.

(30) Foreign Application Priority Data

Apr. 14, 2021 (IN) .............................. 202141017378
Apr. 12, 2022 (IN) ............................. 2021 41017378

(51) Int. Cl.
*H04W 28/02* (2009.01)
(52) U.S. Cl.
CPC .............................. *H04W 28/0268* (2013.01)
(58) Field of Classification Search
CPC ........... H04W 28/0268; H04W 28/065; H04L 47/36; G06N 3/08
See application file for complete search history.

(56) References Cited

U.S. PATENT DOCUMENTS 9,264,942 B2 2/2016 Sarkar et al.
10,321,359 B2 6/2019 Gao et al.
(Continued)

FOREIGN PATENT DOCUMENTS

EP 3 334 215 A1 6/2018
KR 10-2019-0058319 A 5/2019
(Continued)

OTHER PUBLICATIONS

International Search Report dated Jul. 26, 2022, issued in International Application No. PCT/KR2022/005407.
(Continued)

*Primary Examiner* — Jung H Park
(74) *Attorney, Agent, or Firm* — Jefferson IP Law, LLP

(57) ABSTRACT

A method for communication by a source general packet radio service tunnelling protocol user (GTP-U) node in a wireless network is provided. The method includes receiving at least one data packet from at least one user equipment (UE), determining whether the at least one received data packet is at least one guaranteed bit rate (GBR) data packet or at least one non-GBR data packet, if the at least one received data packet is the at least one GBR data packet, transmitting the at least one received GBR data packet to at least one target GTP-U node, if the at least one received data packet is the at least one non-GBR data packet, storing the at least one received non-GBR data packet into a buffer before transmitting to the at least one target GTP-U node, and transmitting the at least one received non-GBR data packet to the at least one target GTP-U node based on a maximum segment size (MSS) of the buffer.

18 Claims, 5 Drawing Sheets

(56) References Cited

U.S. PATENT DOCUMENTS

| | | |
|---|---|---|
| 2009/0310487 A1 | 12/2009 | Eriksson |
| 2010/0135229 A1 | 6/2010 | Lohr et al. |
| 2014/0328170 A1* | 11/2014 | Racz .................. H04W 28/10 |
| | | 370/230 |
| 2015/0282152 A1 | 10/2015 | Wang et al. |
| 2018/0139651 A1 | 5/2018 | Kim et al. |
| 2019/0364492 A1 | 11/2019 | Azizi et al. |
| 2022/0182185 A1* | 6/2022 | Bostrom ............. H04L 41/5009 |

FOREIGN PATENT DOCUMENTS

| | | |
|---|---|---|
| WO | 2013/144094 A1 | 10/2013 |
| WO | 2020/068952 A1 | 4/2020 |

OTHER PUBLICATIONS

Extended European Search Report dated Mar. 1, 2024, issued in European Patent Application No. 22788469.9.
Indian Office Action dated Dec. 1, 2022, issued in Indian Patent Application No. 202141017378.

\* cited by examiner

METHOD AND ELECTRONIC APPARATUS FOR OPTIMIZING BANDWIDTH UTILIZATION GTP-U DATA PACKET TRANSMISSION

CROSS-REFERENCE TO RELATED APPLICATION(S)

This application is a continuation application, claiming priority under § 365(c), of an International application No. PCT/KR2022/005407, filed on Apr. 14, 2022, which is based on and claims the benefit of an Indian Provisional patent application number 202141017378, filed on Apr. 14, 2021, in the Indian Intellectual Property Office, and an Indian Complete patent application number 202141017378, filed on Apr. 12, 2022, in the Indian Intellectual Property Office, the disclosure of each of which is incorporated by reference herein in its entirety.

BACKGROUND

1. Field

The disclosure relates to a wireless network. More particularly, the disclosure relates to a method and an electronic apparatus for optimizing bandwidth utilization during general packet radio service tunnelling protocol user (GTP-U) data packet transmission in the wireless network.

2. Description of Related Art

In a cellular network, a general packet radio services (GPRS) tunnelling protocol-uplink (GTP-U) protocol is used for data packet transmission between GTP-U node(s) (e.g., serving gateway (SGW), packet data network (PDN) gateway (PGW), SGW-user plane function (SGW-U), PGW-U, E-UTRAN Node B (eNodeB), a user plane function (UPF), gNodeB) according to a $3^{rd}$ generation partnership project (3GPP) proposed architecture and protocol stack. According to the GTP-U protocol, a tunnel endpoint identifier (TEID) is assigned to each node for a single protocol data unit (PDU) session of a user equipment (UE). The data packet at every node for the UE's PDU session is identified using the Tunnel Endpoint Identifier (TEID).

As per data packet transmission mechanism of the related art, when the data packet from the UE travels between the GTP-U nodes, then a GTP-U header is added over a payload by the GTP-U node(s) regardless of whether the data packet is uplink or downlink. The data packet from one to ten thousand UEs may be sent across the GTP-U node(s) at the same time. Regardless of whether the data packet is a low latency data packet (e.g., a guaranteed bit rate (GBR) data packet) or a high latency data packet (e.g., non-GBR data packet), as soon as the GTP-U node(s) receives the payload, the GTP-U node(s) adds the GTP-U header and transmits the data packet to a peer GTP-U node(s)/entity.

For enhanced user experience, the GTP-U node(s) must send the low latency data packet as soon as received from the UE and/or another GTP-U node(s). However, the same mechanism is not required for the high latency data packet. The data packet transmission mechanism of the related art employs the same mechanism for both low latency data packet and high latency data packet.

For example, if the data packet belongs to a low latency application (e.g., voice application), then the data packet needs to be sent without any delay and the data packet transmission mechanism of the related art is the best-suited mechanism without any buffering of the data packet. The data packet transmission mechanism of the related art employs the same mechanism for a high latency application (e.g., an Internet surfing application), the data packet sends without buffering, which underutilizes a bandwidth of the cellular network. Therefore, an intelligent transmission mechanism for the high latency application is required, in which the GTP-U node(s) optimizes bandwidth utilization while avoiding needless immediate data packet transmission for the high latency application to conserve cellular network resources.

Thus, it is desired to provide a useful alternative for optimizing bandwidth during GTP-U data packet transmission in the cellular network.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to optimize bandwidth utilization during general packet radio service tunnelling protocol user (GTP-U) data packet transmission in a wireless network by intelligently transmitting a guaranteed bit rate (GBR) data packet and/or a non-GBR data packet. A source GTP-U node immediately transmits the GBR data packet to a target GTP-U node and the source GTP-U node transmits the non-GBR data packet based on either a maximum segment size (MSS) for each buffer of the source GTP-U node or a timer for each buffer of the source GTP-U node. The source GTP-U node includes a plurality of buffers, where each buffer corresponds to the target GTP-U node. The buffer size is calculated by, for example, Tabnet (DNN model) or any gradient boosting machine learning mechanism and MSS condition is enforced on maximum buffer size. As a result, the GTP-U node(s) optimizes the bandwidth utilization while avoiding needless immediate data packet transmission for the non-GBR data packet (e.g., high latency application) and conserves cellular network resources.

Another aspect of the disclosure is to combine multiple GTP-U packets (e.g., a non-GBR data packet) in a single GTP-U packet to avoid consumption of an Internet protocol (IP) header and a user datagram protocol (UDP) header repeatedly when the MSS is less than a pre-defined value (e.g., 1500 bytes).

Another aspect of the disclosure is to buffer the non-GBR data packet at the source GTP-U node which needs to be transmitted towards the same target GTP-U node based on the MSS or the timer. The source GTP-U node then sends the non-GBR data packet when a size of a combined GTP-U packet (i.e., buffered non-GBR data packet of the related art and currently received non-GBR data packet) meets/crosses the MSS or the timer meets/crosses a pre-defined maximum timer value. The pre-defined maximum timer value for buffering the non-GBR data packet is determined by an artificial intelligence (AI) model/machine learning (ML).

Additional aspects will be set forth in part in the description which follows and, in part, will be apparent from the description, or may be learned by practice of the presented embodiments.

In accordance with an aspect of the disclosure, a method for communication by a source general packet radio service tunnelling protocol user (GTP-U) node in a wireless network is provided. The method includes receiving at least one data packet from at least one user equipment (UE), determining whether the at least one received data packet is at least one guaranteed bit rate (GBR) data packet or at elast one non-GBR data packet, if the at least one received data packet is the at least one GBR data packet, transmitting the at least one received GBR data packet to at least one target GTP-U node, if the at least one received data packet is the at least one non-GBR data packet, storing the at least one received non-GBR data packet into a buffer before transmitting to the at least one target GTP-U node, and transmitting the at least one received non-GBR data packet to the at least one target GTP-U node based on a maximum segment size (MSS) of the buffer.

In accordance with another aspect of the disclosure, a source GTP-U node for communication in a wireless network is provided. The source GTP-U node includes a memory, and at least one processor coupled to the memory, wherein the at least one processor is configured to, receive at least one data packet from at least one user equipment (UE), determine whether the at least one received data packet is at least one guaranteed bit rate (GBR) data packet or at least one non-GBR data packet, if the at least one received data packet is the at least one GBR data packet, transmit the at least one received GBR data packet to at least one target GTP-U node, if the at least one received data packet is the at least one non-GBR data packet, store the at least one received non-GBR data packet into a buffer before transmitting to the at least one target GTP-U node, and transmit the at least one received non-GBR data packet to the at least one target GTP-U node based on a maximum segment size (MSS) of the buffer.

In accordance with another aspect of the disclosure, a non-transitory computer readable storage medium configured to store one or more computer programs including instructions that, when executed by at least one processor of a source general packet radio service tunnelling protocol user (GTP-U) node in a wireless network, cause the GTP-U node to perform operations is provided. The operations includes receiving at least one data packet from at least one user equipment (UE), determining whether the at least one received data packet is at least one guaranteed bit rate (GBR) data packet or at least one non-GBR data packet, if the at least one received data packet is the at least one GBR data packet, transmitting the at least one received GBR data packet to at least one target GTP-U node, if the at least one received data packet is the at least one non-GBR data packet, storing the at least one received non-GBR data packet into a buffer before transmitting to the at least one target GTP-U node, and transmitting the at least one received non-GBR data packet to the at least one target GTP-U node based on a maximum segment size (MSS) of the buffer.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF FIGURES

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

Figure 1A:
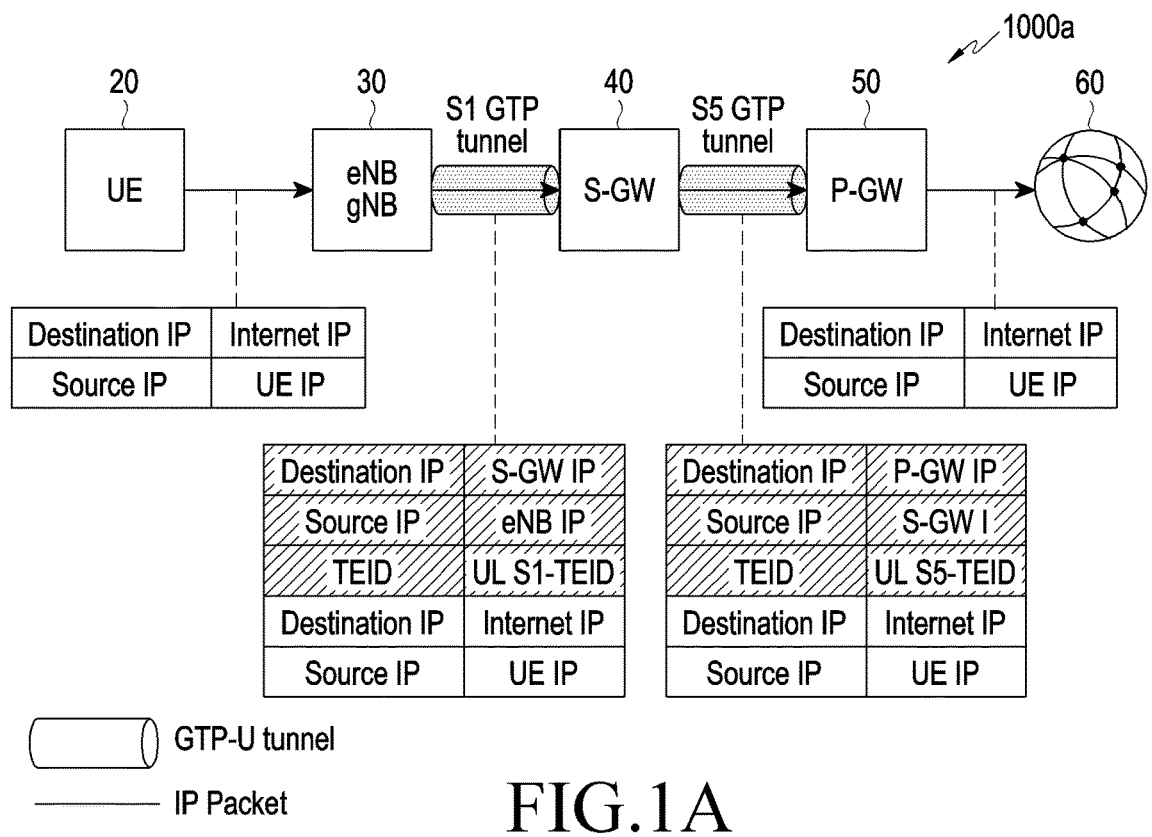
FIGS. 1A and 1B illustrate a general packet radio service tunnelling protocol user (GTP-U) data packet transmission mechanism according to the related art.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In addition, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components, or the like, are physically implemented by analog and/or digital circuits, such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports, such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Similarly, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the disclosure should be construed to extend to any alterations, equivalents, and substitutes in addition to those which are particularly set out in the accompanying drawings. Although the terms first, second, or the like, may be used herein to describe various elements, these elements should not be limited by these terms. These terms are generally only used to distinguish one element from another.

Throughout this disclosure, the terms "data packet", "packet data" and "GTP-U data packet" are used interchangeably and mean the same. Throughout this disclosure, the terms "network", "wireless network" and "cellular network" are used interchangeably and mean the same. Throughout this disclosure, the terms "node", "UE", "network entity" and "electronic apparatus" are used interchangeably and mean the same.

Figure 1B:
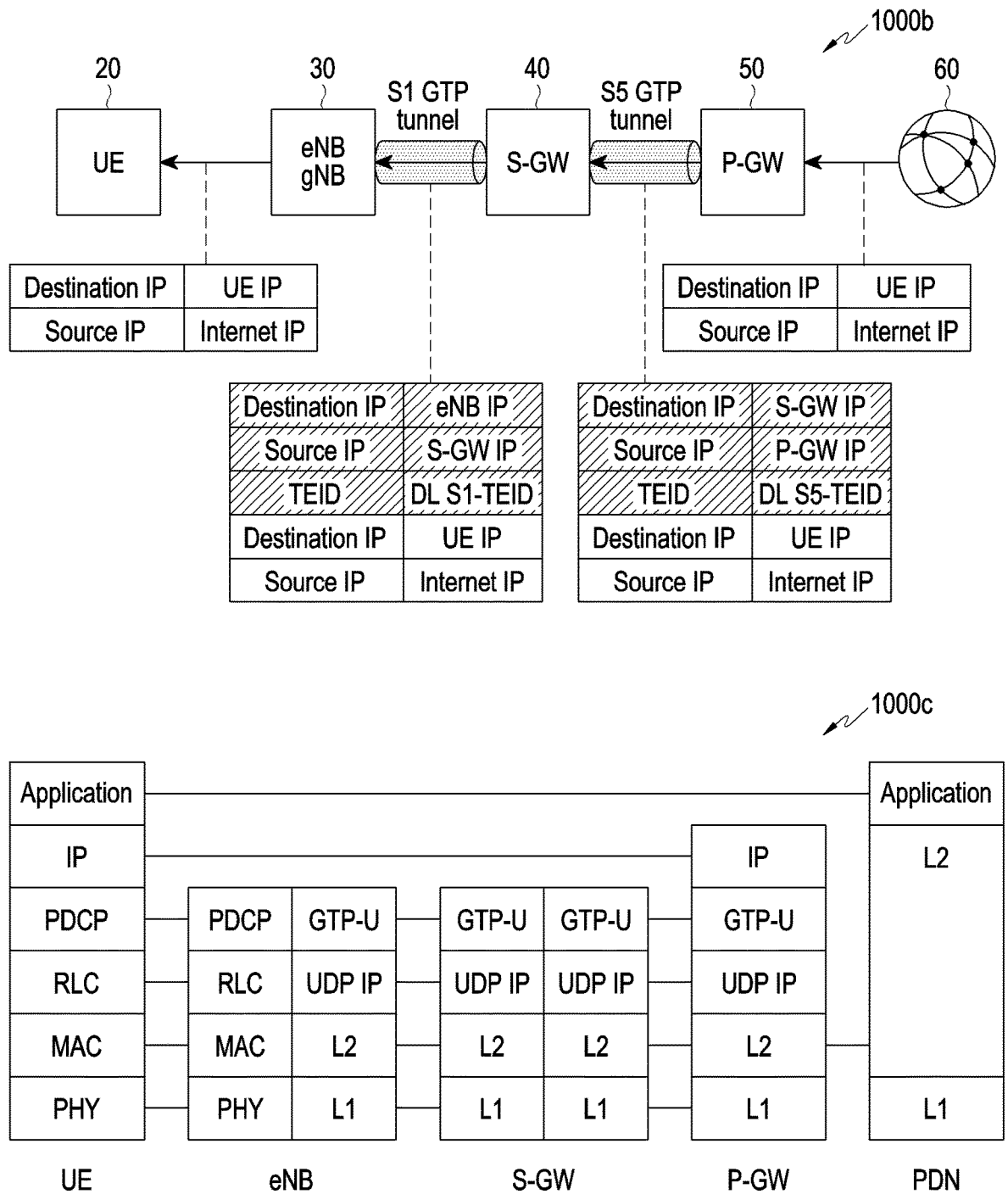

FIGS. 1A and 1B illustrates a general packet radio service tunnelling protocol user (GTP-U) data packet transmission mechanism according to the related art.

Referring to FIGS. 1A and 1B, general packet radio service (GPRS) tunnelling protocol (GTP) is a tunnelling protocol defined by 3GPP standards to carry GPRS packets within third-generation (3G)/fourth-generation (4G) cellular networks. The GTP is used to establish a GTP tunnel between a serving gateway (S-GW) and packet data network (PDN) Gateway (P-GW), and mobility management entity (MME) for a user equipment (UE). The GTP tunnel is a channel between two GPRS support nodes through which two hosts exchange data. The S-GW receives packets from the UE and encapsulates them within a GTP header (10) before forwarding them to the P-GW through the GTP tunnel. When the P-GW receives the packets, it decapsulates the packets and forwards the packets to an external host. The GTP includes the following separate protocols.

GTP-C: Performs signaling between the S-GW and P-GW in core GPRS network to activate and deactivate subscriber sessions, adjust a quality of service parameters, or update sessions for roaming subscribers who have arrived from another S-GW. The GTP-C supports transport of control packets in Internet Protocol version 4 (IPv4) format.

GTP-U: Transports user data within the core GPRS network and between the radio access network (RAN) and the core network. The GTP-U supports IPv4 and Internet protocol version 6 (IPv6) user data, but transport is IPv4.

The GTP header (10) has the information related to tunnel endpoint identifier (TEID) information which indicates which UE's PDU session the packet belongs to. The GTP-U header (10) and the TEID to identify a packet(s) to which the data belongs when it receives the packet are proposed by the 3GPP standard. The 3GPP standard proposed by the GTP-U header format (10) is shown in FIG. 1A.

Example scenarios for packet data flow (1000a, 1000b, 1000c) in the 4G/5$^{th}$ generation (5G) cellular networks are illustrated in FIGS. 1A and 1B. The 4G/5G cellular networks include a UEs (20), an eNB/gNB (30), an S-GW (40), a P-GW (50), and a PDN (60).

In the 4G cellular network: the S-GW (40), the P-GW (50), the eNB (30) are GTP-U node(s), where the GTP-U protocol is used for data flow/transmission in between them. While in 5G cellular network, a User Plane Function (UPF), the gNB (30) are the GTP-U node(s), where the GTP-U protocol is used for data flow/transmission in between them.

There are two types of data flow namely an uplink data flow and a downlink data flow for a PDU session of the UEs (20).

In the 4G cellular network: the uplink data flow (1000a) from the UEs (20) towards the PDN (60) via the eNB (30), the S-GW (40), the P-GW (50). Furthermore, the downlink data flow (1000b) from the PDN (60) towards the UEs (20) via the P-GW (50), the S-GW (40), and the eNB (30).

In 5G cellular network: the uplink data flow (1000a) from the UEs (20) towards the PDN (60) via the gNB (30) and the UPF. Furthermore, the downlink data flow (1000b) from the PDN (60) towards the UEs (20) via the UPF and the gNB (30).

Furthermore, there can be many UE's connected in the 4G/5G cellular networks, and there can be a maximum of 11 PDU sessions or bearer for the UE (20). The eNB/gNB (30), the S-GW (40), the P-GW (50) caters data services to many UE's PDU sessions. In these above nodes (e.g., GTP-U node(s)) as said, since there can be many UE's data flows, the TEIDs identify the data to which UE's PDU session belongs. The TEIDs are allocated at the GTP-U node(s) per UE's PDU session. Every packet which is transmitted between the GTP-U node(s), the GTP header added over a payload which is received for the UE's PDU session For example, an application layer of the UEs (20) has a straight connection with an application layer of the PDN (60). The Application layer(s) is not changed or processed in between the eNB (30), the S-GW (40), the P-GW (50) as shown in the FIG. 1A (1000c). When an uplink packet (1000a) for the PDU session is received at the eNB (30) from the UEs (20) along with information (e.g., destination IP as internet IP and source IP as UE IP), then the eNB (30) adds the GTP-U header with information related to the S-GW (40) (e.g., destination IP as S-GW IP, source IP as eNB IP, and TEID) and the eNB (30) forwards the same information towards the S-GW (40). Further, the S-GW (40) removes the GTP-U header information received from the eNB (30), adds the GTP-U header information related to the P-GW (50) (e.g., destination IP as P-GW IP, source IP as S-GW IP, and TEID) and sends information towards the P-GW (50). Similarly, the P-GW (50) removes the GTP-U header information and sends only the packet sent by the UEs (20) towards the PDN (60).

For a downlink packet (1000b), which travels from the PDN (60) towards the UEs (20) along with information (e.g., destination IP as UE IP and source IP as internet IP). The PDN (60) sends the information towards the P-GW (50). The P-GW (50) adds the GTP-U header information related to the S-GW (40) (e.g., destination IP as S-GW IP, source IP as P-GW IP, and TEID) and sends information towards the S-GW (40). The S-GW (40) removes the GTP-U header information received from the P-GW (50) and adds the GTP-U header information related to the eNB (20) (e.g., destination IP as eNB IP, source IP as S-GW IP, and TEID) Similarly, the eNB (20) removes the GTP-U header information received from the S-GW (40) and sends only the packet that the PDN (60) has sent towards the UEs (20).

Furthermore, the packet data flow or application used by the UEs (20) can be classified into two types: a low latency application and a high latency application. Alternatively, the applications used by the UEs (20) can be differentiated based on the application's latency needs as given below.

Low latency application: the latency requirements are very less and there cannot any comprise in terms of latency.

High latency application: the latency requirements are very high and make little difference if the packets are sent late.

In other terms, the packet data flow or application by the UEs (20) can be classified into GBR packets and non-GBR packets.

GBR data packets: which travels via a bearer where there is a guaranteed service, or in other words, where an evolved packet core (EPC) network guarantees bit rate that can be delivered for it. Voice traffic is one such example that may be classified as the low latency application, as the low latency application requires GBR service from the EPC network to ensure that there is no delay in voice traffic.

Non-GBR data packets: which might require only a non-GBR bearer for packet data flow/transmission. Internet of things (IoT) application data traffic is one such example that may be classified as the high latency application.

As previously stated, the GTP-U data packet transmission mechanism of the related art makes no distinction between the low latency packets (GBR data packets) and the high latency packets (non-GBR data packets). When the GTP-U node(s) receives a data packet for a PDU session, the GTP-U node(s) adds the necessary GTP-U header information and passes the same information to a peer GTP-U node (s). Consider there is multiple high latency application-related payload related to different or same UE PDU session that needs to be transmitted from the source GTP-U node towards the target GTP-U node. The traditional way of transmission is that even many GTP-U packets need to be transmitted between the same GTP-U node at the same point of time each packet will be treated separately and the GTP-U header information will be added and sent individually, which is wastage of cellular network resources.

For example, 1 to 1000 UE PDU sessions may exist at the S-GW (40), which is linked to the same eNB (20) and the P-GW (50). The maximum number of UE PDU sessions that may be handled at S-GW (40) is determined by vendor company design, and there is no capacity constraint enforced by 3GPP on the S-GW (40). When the S-GW (40) receives an uplink data packet during any PDU session, then the S-GW (40) removes the GTP-U header and adds the GTP-U header information related to the P-GW (50) before sending the uplink data packet. IP header information and UDP header information will be identical for all packets transferred from the S-GW (40) to the same eNB (20) or the P-GW (50). The GTP-U header will be different for different PDU sessions, hence the GTP-U header is needed for transmission, but IP header information and UDP header information will be same if the data packets are sent between the same GTP-U Node. But the GTP-U data packet transmission mechanism of the related art adds the IP header information and UDP header information unnecessary for each data packet, which is the wastage of the cellular network resources.

Consider another example scenario for the GTP-U data packet transmission mechanism of the related art, where the source GTP-U node receives the data packets of various sizes from the multiple UEs with the same destination address or directed towards the same target GTP-U node. The source GTP-U node can transmit the data packets up to 1500 bytes in size, but the source GTP-U node can only receive data packets up to 500 bytes in size from multiple UEs. According to the GTP-U data packet transmission mechanism of the related art, the source GTP-U node sends the data packet instantly without buffering, which results in underutilization of the cellular network's bandwidth. To conserve the cellular resources, an intelligent transmission method for the high latency application is required, in which the GTP-U node(s) optimize bandwidth consumption while avoiding unnecessary immediate data packet transmission for the high latency application.

Accordingly, the embodiment herein is to provide a method for managing bandwidth in a wireless network based on a type of data packet. The method includes receiving, by a source general packet radio service tunnelling protocol user (GTP-U) node, a data packet(s) from a user equipment (UE) in the wireless network. Further, the method includes determining, by the source GTP-U node, whether the received data packet(s) is a guaranteed bit rate (GBR) data packet(s) or a non-GBR data packet(s). Further, the method includes immediately transmitting, by the source GTP-U node, the received GBR data packet(s) to a target GTP-U node. Further, the method includes storing, by the source GTP-U node, the received non-GBR data packet(s) into a buffer before transmitting to the target GTP-U node. Further, the method includes transmitting, by the source GTP-U node, the received non-GBR data packet(s) to the target GTP-U node based on a maximum segment size (MSS) of the buffer.

Accordingly, the embodiment herein is to provide the source GTP-U node for managing bandwidth in the wireless network based on the type of data packet(s). The source GTP-U node includes a bandwidth controller coupled with a processor and a memory. The bandwidth controller receives the data packet(s) from the UE in the wireless network. Further, the bandwidth controller determines whether the received data packet(s) is the GBR data packet(s) or the non-GBR data packet(s). Further, the bandwidth controller immediately transmits the received GBR data packet(s) to the target GTP-U node. Further, the bandwidth controller stores the received non-GBR data packet(s) into the buffer before transmitting to the target GTP-U node. Further, the bandwidth controller transmits the received non-GBR data packet(s) to the target GTP-U node based on the MSS of the buffer.

Unlike methods and systems of the related art, the proposed method allows the GTP-U node(s) to optimize bandwidth utilization during general packet radio service tunnelling protocol user (GTP-U) data packet transmission in a wireless network by intelligently transmitting the GBR data packet and/or the non-GBR data packet. The source GTP-U node immediately transmits the GBR data packet to the target GTP-U node and the source GTP-U node transmits the non-GBR data packet based on either the MSS for each buffer of the source GTP-U node or the timer for each buffer of the source GTP-U node. The source GTP-U node includes a plurality of buffers, where each buffer corresponds to the target GTP-U node. As a result, the GTP-U node(s) optimize bandwidth utilization while avoiding needless immediate data packet transmission for the non-GBR data packet (e.g., a high latency application) and conserves cellular network resources.

Unlike methods and systems of the related art, the proposed method allows the GTP-U node(s) to combine multiple GTP-U packets (e.g., non-GBR data packet) in single GTP-U packet to avoid consumption of an Internet protocol (IP) header and a user datagram protocol (UDP) header repeatedly when the MSS is less than a pre-defined value (e.g., 1500 byte).

Unlike methods and systems of the related art, the proposed method allows the GTP-U node(s) to buffer the non-GBR data packet at the source GTP-U node which needs to be transmitted towards the same target GTP-U node based on the MSS or the timer. The source GTP-U node then sends the non-GBR data packet when a size of a combined GTP-U packets (i.e., buffered non-GBR data packet of the related art and currently received non-GBR data packet) meets/crosses the MSS or the timer meets/crosses a pre-defined maximum timer value. The pre-defined maximum timer value for buffering the non-GBR data packet is determined by an artificial intelligence (AI) model/machine learning (ML).

Figure 2:
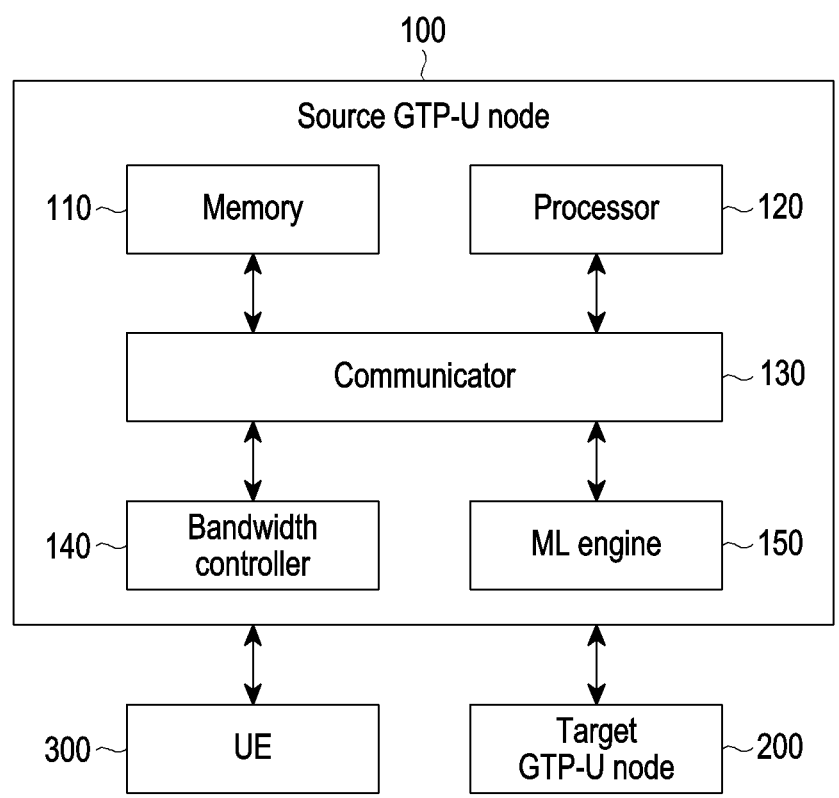
FIG. 2 illustrates a system block diagram of a source GTP-U node for optimizing bandwidth utilization during a GTP-U data packet transmission in a wireless network according to an embodiment of the disclosure.
Figure 3:
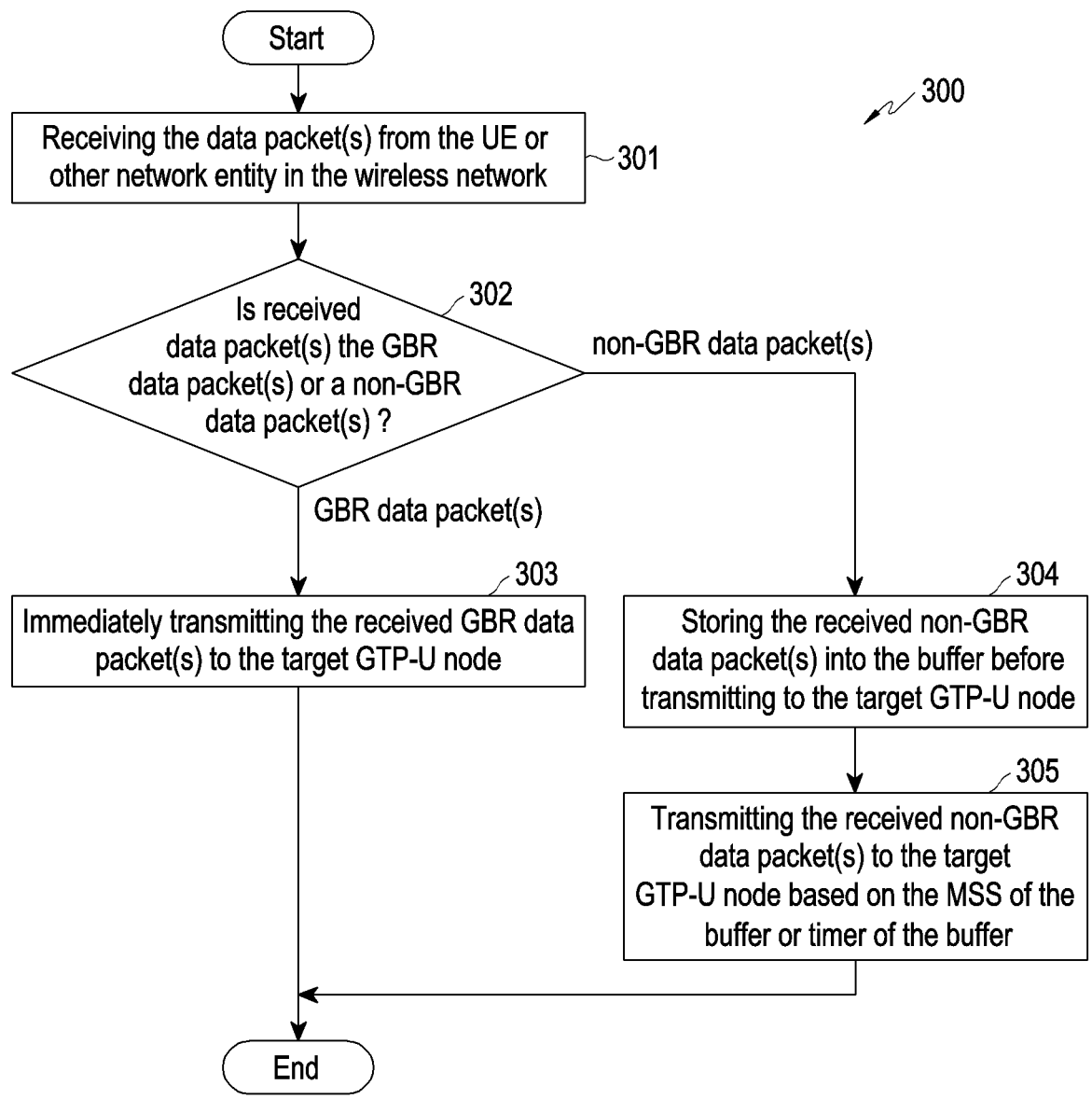
FIG. 3 is a flow diagram illustrating a method for optimizing bandwidth utilization during a GTP-U data packet transmission in a wireless network according to an embodiment of the disclosure.
Figure 4:
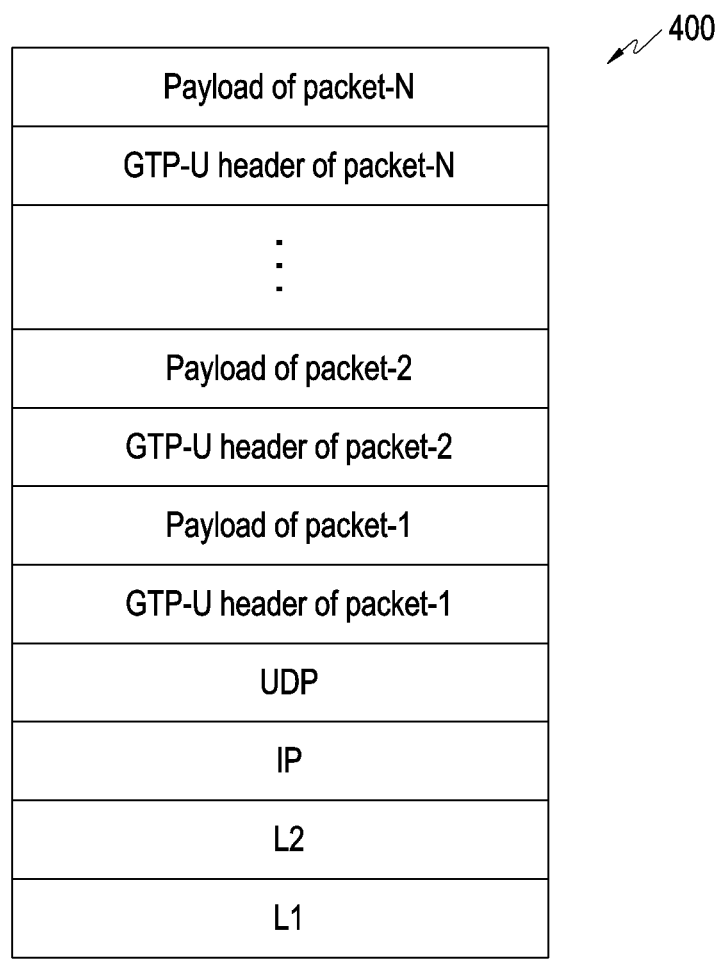
FIG. 4 illustrates a protocol stack of a GTP-U packet for optimizing bandwidth utilization during a GTP-U data packet transmission in the wireless network according to an embodiment of the disclosure.

Referring now to the drawings and more particularly to FIG. 2 through 4, where similar reference characters denote corresponding features consistently throughout the figures, there are shown preferred embodiments.

FIG. 2 illustrates a system block diagram of a source GTP-U node for optimizing bandwidth utilization during a GTP-U data packet transmission in a wireless network according to an embodiment of the disclosure.

Referring to FIG. 2, examples of the source GTP-U node (100) or a target GTP-U node (200) include, but are not limited to a base station, E-UTRAN Node B (eNB), gNodeB, a serving gateway (S-GW) and packet data network (PDN) gateway (P-GW), and mobility management entity (MME), or the like. Examples of a user equipment (UE) (300) include, but are not limited to a smartphone, a tablet computer, a personal digital assistance (PDA), an Internet of things (IoT) device, a wearable device, or the like.

In an embodiment of the disclosure, the source GTP-U node (100) includes a memory (110), a processor (120), a communicator (130), a bandwidth controller (140), and a machine learning (ML) engine (150).

In an embodiment of the disclosure, the memory (110) stores a data packet(s), a maximum segment size (MSS) of each buffer, and a pre-defined maximum timer value for each buffer. The memory (110) stores instructions to be executed by the processor (120). The memory (110) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (110) may, in some examples, be considered a non-transitory storage medium. The term "non-transitory" may indicate that the storage medium is not embodied in a carrier wave or a propagated signal. However, the term "non-transitory" should not be interpreted that the memory (110) is non-movable. In some examples, the memory (110) can be configured to store larger amounts of information than the memory. In certain examples, a non-transitory storage medium may store data that can, over time, change (e.g., in random access memory (RAM) or cache). The memory (110) can be an internal storage unit or it can be an external storage unit of the source GTP-U node (100), a cloud storage, or any other type of external storage.

The processor (120) communicates with the memory (110), the communicator (130), the bandwidth controller (140), and the ML engine (150). The processor (120) is configured to execute instructions stored in the memory (110) and to perform various processes. The processor (120) may include one or a plurality of processors, maybe a general-purpose processor, such as a central processing unit (CPU), an application processor (AP), or the like, a graphics-only processing unit, such as a graphics processing unit (GPU), a visual processing unit (VPU), and/or an Artificial intelligence (AI) dedicated processor, such as a neural processing unit (NPU).

The communicator (130) is configured for communicating internally between internal hardware components and with external devices (e.g., an eNodeB, a gNodeB, a server, a UE, or the like) via one or more networks (e.g., radio technology). The communicator (130) includes an electronic circuit specific to a standard that enables wired or wireless communication. The communicator (130) may be referred to as a transceiver.

The bandwidth controller (140) is implemented by processing circuitry, such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports, such as printed circuit boards, and the like. In some embodiments, the bandwidth controller (140) is included in the processor (120). The operations of the bandwidth controller (140) are also understood as operations executed by the processor (120).

In an embodiment of the disclosure, the bandwidth controller (140) receives the data packet(s) from the UE (300) and/or other network entity (e.g., a server) in the wireless network. The bandwidth controller (140) then determines whether the received data packet(s) is a guaranteed bit rate (GBR) data packet(s) or a non-GBR data packet(s). The bandwidth controller (140) then immediately transmits the received GBR data packet(s) to the target GTP-U node (200) and stores the received non-GBR data packet(s) into a buffer (internal storage unit or can be an external storage unit) before transmitting to the target GTP-U node (200). The bandwidth controller (140) then transmits the received non-GBR data packet(s) to the target GTP-U node (200) based on the MSS of the buffer. Each node (e.g., source GTP-U node (100)) includes a plurality of buffers, where each buffer corresponds to the target GTP-U node (200), where the target GTP-U node (200) is connected with the source GTP-U node (100).

The bandwidth controller (140) detects a plurality of received non-GBR data packet(s) of the received non-GBR data packet(s) transmit towards same target GTP-U node (e.g., 200a) of the target GTP-U node (200). The bandwidth controller (140) then combines the received non-GBR data packet(s) with existing buffered non-GBR data packet(s) before transmitting the received non-GBR data packet(s) to the target GTP-U node (200). The bandwidth controller (140) then determines whether a size of combined non-GBR data packet(s) meets the MSS. The bandwidth controller (140) then transmits the combined non-GBR data packet(s) to the target GTP-U node (200) in response to determining that the size of the combined non-GBR data packet(s) meets the MSS or continuously monitors the buffer in response to determining that the size of the combined non-GBR data packet(s) does not reach the MSS.

In an embodiment of the disclosure, the bandwidth controller (140) initiates the timer for each buffer. The bandwidth controller (140) then determines whether the timer meets the pre-defined maximum timer value for the received non-GBR data packet(s). The bandwidth controller (140) then transmits the buffered non-GBR data packet(s) to the target GTP-U node (200), in response to determining that the timer meets the pre-defined maximum timer value or continuously monitors the buffer in response to determining that the buffer does not reach the pre-defined maximum timer value.

In an embodiment of the disclosure, the bandwidth controller (140) determines the pre-defined maximum timer value for buffering the non-GBR data packet(s) based on the ML engine (150).

In an embodiment of the disclosure, the bandwidth controller (140) configures a plurality of buffers, where each buffer of the plurality of buffers includes a pre-defined MSS. As an example, according to the 3GPP, each QoS class identifier (QCI) has different latency requirements. To buffer the data packet(s) based on the QCI, different buffering times will be used for different QCI based on their latency. For example, QCI-5 has a latency of 100 ms according to the 3GPP, so the buffering time can be 50~75 ms. Furthermore, to begin, the buffering time manually sets based on the latency described above. After gathering enough data, the source GTP-U node (100) uses, for an example, a random forest method to find the pre-defined maximum timer value for buffering the data packet(s).

The ML engine (150) may be implemented through an artificial intelligence (AI) model. A function associated with AI may be performed through the non-volatile memory, the volatile memory, and the processor. One or a plurality of processors control the processing of the input data (e.g., image frame(s)) in accordance with a predefined operating rule or AI model stored in the non-volatile memory and the volatile memory. The predefined operating rule or artificial intelligence model is provided through training or learning. Here, being provided through learning means that, by applying a learning mechanism to a plurality of learning data, a predefined operating rule or AI model of a desired characteristic is made. The learning may be performed in a device itself in which AI according to an embodiment is performed, and/o may be implemented through a separate server/system. The AI model may consist of a plurality of neural network layers. Each layer has a plurality of weight values, and performs a layer operation through calculation of a previous layer and an operation of a plurality of weights.

Examples of neural networks include, but are not limited to, convolutional neural network (CNN), deep neural network (DNN), recurrent neural network (RNN), restricted Boltzmann machine (RBM), deep belief network (DBN), bidirectional recurrent deep neural network (BRDNN), generative adversarial networks (GAN), and deep Q-networks. The learning mechanism is a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

Although FIG. 2 illustrates various hardware components of the source GTP-U node (100) but it is to be understood that other embodiments are not limited thereon. In other embodiments of the disclosure, the source GTP-U node (100) may include less or more number of components. Further, the labels or names of the components are used only for illustrative purpose and does not limit the scope of the disclosure. One or more components can be combined to perform the same or substantially similar function to manage the bandwidth in the wireless network based on the type of data packet(s).

FIG. 3 is a flow diagram (300) illustrating a method for optimizing bandwidth utilization during a GTP-U data packet(s) transmission in a wireless network according to an embodiment of the disclosure.

Referring to FIG. 3, the source GTP-U node (100) performs various operations (301-305) to manage bandwidth in the wireless network.

At operation 301, the method includes receiving the data packet(s) from the UE (300) or other network entity in the wireless network. At operation 302, the method includes determining whether the received data packet is the GBR data packet(s) or the non-GBR data packet(s). At operation 303, the method includes immediately transmitting the received GBR data packet(s) to the target GTP-U node (200). At operation 304, the method includes storing the received non-GBR data packet(s) into the buffer before transmitting to the target GTP-U node. At operation 305, the method includes transmitting the received non-GBR data packet(s) to the target GTP-U node based on the MSS of the buffer or the timer of the buffer.

The various actions, acts, blocks, steps, or the like in the flow diagram (300) may be performed in the order presented, in a different order or simultaneously. Further, in some embodiments of the disclosure, some of the actions, acts, blocks, steps, or the like may be omitted, added, modified, skipped, or the like without departing from the scope of the disclosure.

FIG. 4 illustrates a protocol stack of a GTP-U packet (400) for optimizing bandwidth utilization during a GTP-U data packet(s) transmission in a wireless network according to an embodiment of the disclosure.

Referring to FIG. 4, in general, if the data packet(s) meets the UE (300) or the PDN a few milliseconds later, it is not a concern for the high latency application. In an embodiment of the disclosure, the source GTP-U node (100) buffers the high-latency application-related packets (GBR data packet) for a few milliseconds until the MSS between the two GTPU nodes (e.g., 100a, 100b) is reached, after which the IP/UDP header information is added, by the bandwidth controller (140), and transmitted by the source GTP-U node.

In an embodiment of the disclosure, the source GTP-U node (100) either wait for the configured time or send the data packet(s) to the target GTP-U node (200) when the buffer meets the MSS. If either of these conditions is met, the data packet(s) will be sent to the target GTP-U node (100).

In an embodiment of the disclosure, the source GTP-U node (100) maintains individual buffers for each target GTP-U node (200), and anytime the high latency or the non-GBR data packet needs to be forwarded to the target GTP-U node (200), the buffer associated with that target GTP-U node (200) is used by the source GTP-U node (100).

In an embodiment of the disclosure, the source GTP-U node (100) combines the payload or the data packet(s) of different or same subscriber's PDU session and sends them between/to the target GTP-U node(s) (200). The proposed method is applicable only for the high latency data packet or the non-GBR data packet(s).

For example, if 'N' is the number of data packet(s) that can be combined and sent between the target GTP-U node(s) (200) per second, then amount of data that can be saved is depicted by a below Equation 1.

$$(N-1)*(A+B) \qquad \text{Equation 1}$$

Where 'A' indicates an IP header size and 'B' indicates a UDP header size. The IP header size varies based on whether IPv4 header or IPv6 header, in general 20 bytes of data uses for the IPv4 header and 40 bytes of data uses for the IPv6 header. A UDP header size is of 8 bytes.

The embodiments of the disclosure disclosed herein can be implemented using at least one hardware device and performing network management functions to control the elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for communication by a source general packet radio service tunnelling protocol user (GTP-U) node in a wireless network, the method comprising:
   receiving at least one data packet from at least one user equipment (UE);
   determining whether the at least one received data packet is at least one guaranteed bit rate (GBR) data packet or at least one non-GBR data packet;
   if the at least one received data packet is the at least one GBR data packet, transmitting the at least one received GBR data packet to at least one target GTP-U node;
   if the at least one received data packet is the at least one non-GBR data packet,
      storing the at least one received non-GBR data packet into a buffer before transmitting to the at least one target GTP-U node; and
      transmitting the at least one received non-GBR data packet to the at least one target GTP-U node based on a maximum segment size (MSS) of the buffer.

2. The method of claim 1, wherein transmitting the at least one received non-GBR data packet to the at least one target GTP-U node based on the MSS of the buffer comprises:
   detecting a plurality of received non-GBR data packet of the at least one received non-GBR data packet transmitted towards same target GTP-U node of the at least one target GTP-U node;
   combining the at least one received non-GBR data packet with existing buffered non-GBR data packet before transmitting the at least one received non-GBR data packet to the at least one target GTP-U node;
   determining whether a size of combined non-GBR data packet meets the MSS; and
   performing one of:
      transmitting the combined non-GBR data packet to the at least one target GTP-U node in response to determining that the size of the combined non-GBR data packet meets the MSS, or
      continuously monitoring the buffer in response to determining that the size of the combined non-GBR data packet does not meet the MSS.

3. The method of claim 1,
   wherein each node comprises a plurality of buffers and each buffer corresponds to the at least one target GTP-U node, and
   wherein the at least one target GTP-U node is connected with the source GTP-U node.

4. The method of claim 1, further comprising:
   initiating a timer for each buffer;
   determining whether the timer meets a pre-defined maximum timer value for the at least one received non-GBR data packet; and
   performing one of:
      transmitting the buffered non-GBR data packet to the at least one target GTP-U node in response to determining that the timer meets the pre-defined maximum timer value, or
      continuously monitoring the buffer in response to determining that the buffer does not meet the pre-defined maximum timer value.

5. The method of claim 4, further comprising:
   determining the pre-defined maximum timer value for buffering the non-GBR data packet based on at least one artificial intelligence (AI) model.

6. The method of claim 1, further comprising:
   configuring a plurality of buffers, wherein each buffer of the plurality of buffers comprises a pre-defined MSS.

7. A source general packet radio service tunnelling protocol user (GTP-U) node for communication in a wireless network, the source GTP-U node comprising:
   memory storing instructions; and
   at least one processor,
   wherein the instructions, when executed by the at least one processor, cause the source GTP-U node to:
      receive at least one data packet from at least one user equipment (UE),
      determine whether the at least one received data packet is at least one guaranteed bit rate (GBR) data packet or at least one non-GBR data packet,
      if the at least one received data packet is the at least one GBR data packet, transmit the at least one received GBR data packet to at least one target GTP-U node,
      if the at least one received data packet is the at least one non-GBR data packet,
         store the at least one received non-GBR data packet into a buffer before transmitting to the at least one target GTP-U node, and
         transmit the at least one received non-GBR data packet to the at least one target GTP-U node based on a maximum segment size (MSS) of the buffer.

8. The source GTP-U node of claim 7, wherein the instructions, when executed by the at least one processor, further cause the source GTP-U node to:
   detect a plurality of received non-GBR data packet of the at least one received non-GBR data packet transmitted towards same target GTP-U node of the at least one target GTP-U node,
   combine the at least one received non-GBR data packet with existing buffered non-GBR data packet before transmitting the at least one received non-GBR data packet to the at least one target GTP-U node,
   determine whether a size of combined non-GBR data packet meets the MSS, and
   perform one of:
      transmitting the combined non-GBR data packet to the at least one target GTP-U node in response to determining that the size of the combined non-GBR data packet meets the MSS, or
      continuously monitoring the buffer in response to determining that the size of the combined non-GBR data packet does not meet the MSS.

9. The source GTP-U node of claim 7,
   wherein each node comprises a plurality of buffers and each buffer corresponds to the at least one target GTP-U node, and
   wherein the at least one target GTP-U node is connected with the source GTP-U node.

10. The source GTP-U node of claim 7, wherein the instructions, when executed by the at least one processor, further cause the source GTP-U node to:
- initiate a timer for each buffer;
- determine whether the timer meets a pre-defined maximum timer value for the at least one received non-GBR data packet; and
- perform one of:
  - transmitting the buffered non-GBR data packet to the at least one target GTP-U node in response to determining that the timer meets the pre-defined maximum timer value, or
  - continuously monitoring the buffer in response to determining that the buffer does not meet the pre-defined maximum timer value.

11. The source GTP-U node of claim 10, wherein the instructions, when executed by the at least one processor, further cause the source GTP-U node to:
- determine the pre-defined maximum timer value for buffering the non-GBR data packet based on at least one artificial intelligence (AI) model.

12. The source GTP-U node of claim 10, wherein the instructions, when executed by the at least one processor, further cause the source GTP-U node to:
- configure a plurality of buffers, wherein each buffer of the plurality of buffers comprises a pre-defined MSS.

13. A non-transitory computer readable storage medium configured to store one or more computer programs including instructions that, when executed by at least one processor of a source general packet radio service tunnelling protocol user (GTP-U) node in a wireless network, cause the GTP-U node to perform operations comprising:
- receiving at least one data packet from at least one user equipment (UE),
- determining whether the at least one received data packet is at least one guaranteed bit rate (GBR) data packet or at least one non-GBR data packet,
- if the at least one received data packet is the at least one GBR data packet, transmitting the at least one received GBR data packet to at least one target GTP-U node,
- if the at least one received data packet is the at least one non-GBR data packet,
  - storing the at least one received non-GBR data packet into a buffer before transmitting to the at least one target GTP-U node, and
  - transmitting the at least one received non-GBR data packet to the at least one target GTP-U node based on a maximum segment size (MSS) of the buffer.

14. The non-transitory computer readable storage medium of claim 13, wherein transmitting the at least one received non-GBR data packet to the at least one target GTP-U node based on the MSS of the buffer comprises:
- detecting a plurality of received non-GBR data packet of the at least one received non-GBR data packet transmitted towards same target GTP-U node of the at least one target GTP-U node;
- combining the at least one received non-GBR data packet with existing buffered non-GBR data packet before transmitting the at least one received non-GBR data packet to the at least one target GTP-U node;
- determining whether a size of combined non-GBR data packet meets the MSS; and
- performing one of:
  - transmitting the combined non-GBR data packet to the at least one target GTP-U node in response to determining that the size of the combined non-GBR data packet meets the MSS, or
  - continuously monitoring the buffer in response to determining that the size of the combined non-GBR data packet does not meet the MSS.

15. The non-transitory computer readable storage medium of claim 13,
- wherein each node comprises a plurality of buffers and each buffer corresponds to the at least one target GTP-U node, and
- wherein the at least one target GTP-U node is connected with the source GTP-U node.

16. The non-transitory computer readable storage medium of claim 13, wherein the operations further comprises:
- initiating a timer for each buffer;
- determining whether the timer meets a pre-defined maximum timer value for the at least one received non-GBR data packet; and
- performing one of:
  - transmitting the buffered non-GBR data packet to the at least one target GTP-U node in response to determining that the timer meets the pre-defined maximum timer value, or
  - continuously monitoring the buffer in response to determining that the buffer does not meet the pre-defined maximum timer value.

17. The non-transitory computer readable storage medium of claim 16, wherein the operations further comprises:
- determining the pre-defined maximum timer value for buffering the non-GBR data packet based on at least one artificial intelligence (AI) model.

18. The non-transitory of claim 13, wherein the operations further comprises:
- configuring a plurality of buffers, wherein each buffer of the plurality of buffers comprises a pre-defined MSS.

\* \* \* \* \*